(12) United States Patent
Brockhaus (10) Patent No.: US 10,862,676 B2
(45) Date of Patent: Dec. 8, 2020

(54) METHOD FOR SECURE COMMUNICATION WITH A FIELD MEASURING DEVICE OF PROCESS MEASURING TECHNOLOGY AND A CORRESPONDING FIELD MEASURING DEVICE OF PROCESS MEASURING TECHNOLOGY

(71) Applicant: KROHNE Messtechnik GmbH, Duisburg (DE)

(72) Inventor: Helmut Brockhaus, Oberhausen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 97 days.

(21) Appl. No.: 15/994,705

(22) Filed: May 31, 2018

(65) Prior Publication Data
US 2018/0351735 A1 Dec. 6, 2018

(30) Foreign Application Priority Data
May 31, 2017 (DE) .......................... 10 2017 111 939

(51) Int. Cl.
*H04L 9/08* (2006.01)
*G06F 21/44* (2013.01)
(Continued)

(52) U.S. Cl.
CPC ............ *H04L 9/0825* (2013.01); *G06F 21/44* (2013.01); *G06F 21/6218* (2013.01);
(Continued)

(58) Field of Classification Search
CPC ............ H04L 9/0825; H04L 29/06673; H04L 63/0442; G06F 21/44; G06F 21/6218; G06F 21/73
See application file for complete search history.

(56) References Cited

U.S. PATENT DOCUMENTS 5,606,315 A * 2/1997 Gaskins .................. G06F 21/79
340/5.74
6,026,293 A * 2/2000 Osborn .................. G06F 21/565
455/411

(Continued)

FOREIGN PATENT DOCUMENTS

DE 102012109348 A1 4/2014
EP 2557728 A1 2/2013

OTHER PUBLICATIONS

Sha et al., "One-time Symmetric Key Based Cloud Supported Secure Smart Meter Reading", Aug. 2014, International Conference on Computer Communication and Networks, pp. 1-6 (Year: 2014).*

(Continued)

*Primary Examiner* — Kenneth W Chang
(74) *Attorney, Agent, or Firm* — Whitmyer IP Group LLC (57) ABSTRACT

A method is described for secure communication with a field measuring device of process measuring technology. A plurality of scopes of rights, and a plurality of public keys of a corresponding plurality of asymmetrical key pairs, are stored in the field measuring device. Each public key is assigned a scope of rights, and at least one private key of the corresponding plurality of asymmetric key pairs is stored in an external communicator. Upon establishing contact of the external communicator with the field measuring device, the external communicator identifies itself by a public-key authentication with the stored private key to the field measuring device. The field measuring device authenticates the external communicator using a suitable public key stored in the field measuring device. The field measuring device then opens an operating session in which the external communicator is granted access to the information technology content of the field measuring device.

18 Claims, 4 Drawing Sheets

(51) Int. Cl.
G06F 21/62 (2013.01)
G06F 21/73 (2013.01)
H04L 29/06 (2006.01)

(52) U.S. Cl.
CPC ........ G06F 21/73 (2013.01); H04L 29/06673 (2013.01); H04L 63/0442 (2013.01)

(56) References Cited

U.S. PATENT DOCUMENTS

| | | |
|---|---|---|
| 8,832,447 B2 | 9/2014 | Neumann |
| 9,021,267 B2 | 4/2015 | Neumann |
| 2002/0059518 A1 | 5/2002 | Smeets et al. |
| 2004/0093526 A1* | 5/2004 | Hirsch ................ G06F 21/6218 726/21 |
| 2005/0144437 A1 | 6/2005 | Ransom et al. |
| 2010/0241848 A1* | 9/2010 | Smith .................... G01D 4/004 713/153 |
| 2011/0004685 A1* | 1/2011 | De Groot ........... G05B 19/0425 709/225 |
| 2014/0380040 A1* | 12/2014 | Albahdal .............. H04L 9/3247 713/155 |
| 2015/0106826 A1* | 4/2015 | Hahniche ............ H04L 41/0253 719/321 |

OTHER PUBLICATIONS

European Search Report Application No. 18 170 552.6 Completed: Oct. 4, 2018 9 pages.

* cited by examiner

METHOD FOR SECURE COMMUNICATION WITH A FIELD MEASURING DEVICE OF PROCESS MEASURING TECHNOLOGY AND A CORRESPONDING FIELD MEASURING DEVICE OF PROCESS MEASURING TECHNOLOGY

TECHNICAL FIELD

The invention relates to a method for secure communication with a field measuring device of process measuring technology, wherein the field measuring device has a sensor, an evaluation unit, a fieldbus interface for transmission of measurement data detected and provided by the field measuring device to other bus devices and/or to a process control system, and a communication interface, and wherein an external communication means has external access to information technology content of the field measuring device via the communication interface, wherein the information technology content is not the actual measurement data. In addition, the invention also relates to a field measuring device of process measuring technology with a sensor, an evaluation unit, a fieldbus interface for transmission of measurement data detected and provided by the field measuring device to other bus devices and/or to a process control system, and a communication interface, wherein information technology content of the field measuring device is externally accessible for an external communication means via the communication interface, and wherein the information technology content (Pi, Fi) is not the actual measurement data.

BACKGROUND

Field measuring devices of process measuring technology have been used for many decades in automation technology for measurement value logging in industrial processes. The field measuring devices meteorologically record process variables via their sensors, process, with the evaluation unit, the raw measurement data into a measured variable to be transmitted and transmit this measured variable usually to other bus devices or to a higher-level process control system. The measuring devices work "in the field", they are usually very robust and designed to be interference-proof, since they are exposed to all adversities of the industrial process, sometimes they are used outdoors, so usually there are no "laboratory conditions".

For transmitting the measured data, the field device uses a fieldbus interface that implements an established protocol. The established fieldbus interfaces include, for example, the analog 4-20 mA interface that has been used for decades or the digital HART interface. As a physical transmission medium, in this case, a 2-wire arrangement is often used, wherein the digital signal of the HART protocol is modulated on the analog current signal of the current interface. Fieldbus interfaces of this type only implement comparatively low transmission rates, however, they have an extraordinarily high standing power in the process industry, since their reliability is proven and they are considered safe from manipulation. Fieldbus interfaces often only allow the field measuring device to be influenced to a very limited extent, since access to functionalities of the process measuring device that are outside the actual transmission of measurement results is intentionally not provided via the fieldbus interface.

Sensitive and, thus, protective functionalities of field measuring devices aside from measured data transmission relate, for example, to parameterization, the setting of operating modes, calibration parameters of the process measuring device and diagnosis.

Efforts have been made for some time to equip the previously described field measuring devices with a—further—communication interface, which is usually implemented with more modern communication technologies, so that higher transmission rates and modern user interfaces can be implemented. Essentially non-process-relevant data is to be exchanged via this communication interface, i.e. data which are not actually the actual measurement data.

The subject matter of the present consideration are such field measuring devices that are equipped with a communication unit, via which it is possible for an external means of communication to access information technology content of the field measurement device, wherein this information technology content is not the actual measurement data. Thus, it is not a process interface via which the field measuring device outputs measurement data.

SUMMARY

The object of the present invention is to provide a method for secure communication with a field measuring device of process technology and a corresponding field measuring device in which improper access to the field measuring device by means of a communication interface is prevented with a high certainty.

The object is initially and essentially achieved by the method described above for secure communication with a field measuring device of process measuring technology in that a plurality of scopes of rights is stored in the field measuring device, wherein each scope of rights defines to what extent the information technology content of the field measuring device can be accessed, a plurality of public keys of a corresponding plurality of asymmetrical key pairs are stored in the field measuring device and each public key is assigned a scope of rights and at least one private key of the corresponding plurality of asymmetric key pairs is stored in the external communication means, upon establishing contact of the external communication means with the field measuring device via the communication interface, the external communication means identifies itself by means of a public-key authentication with the stored private key to the field measuring device, the field measuring device authenticates the external communication means using a suitable public key stored in the field measuring device, and after successful authentication, the field measuring device opens an operating session in which the external communication means is granted access to the information technology content of the field measuring device, namely in the scope of rights of the public key corresponding to the suitable private key.

In the present method, the scope of rights within which the information technology content of the field measuring device can be accessed by an external communication means is coupled to the use of a suitable key of an asymmetric key pair. The asymmetric key pair is not used here for the encrypted exchange of user data between the field measuring device and the external communication means, the asymmetric key pair is used here for public-key authentication of the external communication means for the field meter. Of course, it does not contradict the teaching of the present invention, when the subsequent, i.e. following authentication, information exchange between the field measuring device and the external communication means via the communication interface is encrypted. It is of fundamental importance, however, that the field measuring device is designed to have the possibility and the requirement that the external communication means identify itself to the field measuring device by means of input—associated with the private key of the external communication means—and, thus, it is possible for the field measuring device to authenticate the external communication means. Authentication—i.e. the verification of the authenticity of the external means of communication—takes place in the field measuring device on the basis of the public keys stored there. If authentication of the external communication means is not possible with any of the public keys stored in the field measuring device, the external communication means can not access the information technology content of the field measuring device, so that no operating session is opened.

The asymmetry of the key pair is that the private and public keys are different and it is virtually impossible to calculate an inverse or private key from the public key. This facilitates, in particular, the problem of key distribution, since only the private keys are to be kept secret.

The information technology content of the field measuring device can be pure data content, such as parameters and set flags, as well as functions, i.e. algorithms that use data as arguments, i.e. work with the data content.

If it is said that the external communication means identifies itself to the field measuring device by means of public-key authentication with the stored private key, this does not mean that the external communication means reveals its private key or one of its private keys directly to the field measuring device. Authentication is preferably carried out so that the private key of the external communication means remains secret. This can, for example, be such that the field measuring device transmits a random string to the external communication means, the external communication means encrypts the random string with its private key, transmits the encrypted random string to the field measuring device, where the encrypted random string is decrypted with the public key of the field measuring device. If the generated random string matches the returned encrypted and decrypted random string, authentication has succeeded. It is possible to proceed with signed data contents in a similar manner, wherein the external communication means identifies itself by creating a digital signature for the field measuring device. Especially in the last variation, an otherwise frequently used password input can be omitted (e.g. entering a passphrase to release a private key), automatic authentication is possible in this manner.

In a preferred implementation of the method, it is provided that the communication interface is based on the Bluetooth standard. When using this technology, the external communication means, for example in the form of a handheld terminal, must be in close proximity to the field measuring device, to which the external communication means identifies itself. In other preferred implementations, the communication interface enables the establishment of a wireless local area network (WLAN), the use of an infrared (IR) connection, or the establishment of an Ethernet connection.

In a further implementation of the method according to the invention for secure communication with a field measuring device, it is provided that a scope of rights stored in the field measuring device allows access to a group of the following information technology content: Parameters for the representation of data without influence on metrological functions, parameters for commissioning metrological functions, parameters for the calibration of the field measuring device, parameters for special functions and service and parameters for the activation of special functions. Using a suitable choice of the scope of rights, it is possible, in particular, to take into account various requirements of operational safety, for example requirements related to the achievement of a certain Safety Integrity Level (SIL), requirements in the areas of safety and security or simply requirements with regard to user rights by implementing user levels.

Against this background, it is obvious that the right to change parameters for the representation of data without influencing metrological functions is granted less restrictively than, for example, the right to change parameters for the calibration of the field measuring device, which is only granted to a very limited group of people, for example, only certain positions at the manufacturer of the field measuring device, who have suitable facilities for calibration. Thus, it makes sense to give qualified service personnel further-reaching access to information technology content of the field measuring device, than is possible for the mere user of the field measuring device. Another advantageous application is the release of special functions that the user has subsequently acquired from the manufacturer of the field measuring device and which can be unlocked with the aid of suitable authentication or automatically released as soon as an operating session has been started with the corresponding key.

According to an advantageous implementation, the claimed method provides that the same scopes of rights are stored in a plurality of field measuring devices and the same public keys of a corresponding plurality of asymmetrical key pairs are stored. This measure makes it possible to access a plurality of field meters in a particularly simple manner using one external communication means that has the corresponding private key.

A particular development of the method is characterized in that the plurality of field measuring devices belong to at least one of the following measuring device groups: the measuring device group of a specific measuring method, the measuring device group of a field measuring device model, the measuring device group of the field measuring devices of a specific user or owner, the measuring device group of the field measuring devices of a system or a part of the system, the measuring device group of the field measuring devices of a certain temporal production interval or installation interval. The aforementioned measuring device groups essentially represent access rights for differently qualified groups of persons. Thus, it may make sense for access for service technicians who are trained, for example, in the field of flow meters or radar meters, to be limited to just such field measuring devices. It may also be necessary to restrict access to certain field device models if special qualifications are required, for example in explosion protection. Restricting access to an industrial system or a specific industrial part of the system may also be useful if clear responsibilities for such areas are given. The same applies to the other groups of measuring instruments mentioned above.

The question of ending an established operating session is also important. In preferred implementations of the method, an operating session is terminated, for example, after a predetermined number of accesses to the information technology content of the field measuring device and/or after a predetermined period of time has elapsed after the operating session was started and/or after transmission of information for the explicit termination of the operating session and/or after occurrence of an error condition in the field measuring device. The various criteria may be implemented separately or in combination in the method.

In a further development of the method, it is provided that a plurality of private keys are stored in the external communication means and the external communication means identifies itself to the field measuring device by means of a public-key authentication in that identification data of the field measuring device is transmitted to the external communication means, the external communication means selects a suitable private key based on the identification data and the external communication means identifies itself to the field measuring device with the selected suitable private key. This variation enables the targeted selection of one private key of a plurality of private keys stored in the external communication means when connection is made to a particular field measuring device. This makes it possible to set up secure communication with a variety of different field measuring devices, even if they are equipped with very different asymmetric key pairs or the corresponding public keys.

In one variation of the claimed method for secure communication with a field measuring device, the authentication process is triggered by a corresponding input in an operating unit of the field measuring device.

In a further development of the method, the external communication means and the field measuring device communicate via the communication interface by means of an encrypted secure shell network protocol (SSH), wherein the external communication means identifies itself to the field measuring device by means of public-key authentication; i.e. entering a password is not required.

In the case of the field measuring device of process measuring technology described in the introduction, the derived object is achieved in that a plurality of scopes of rights is stored in the field measuring device, wherein each scope of rights defines to what extent the information technology content of the field measuring device can be accessed, a plurality of public keys of a corresponding plurality of asymmetrical key pairs are stored in the field measuring device and each public key is assigned a scope of rights, wherein at least one private key of the corresponding plurality of asymmetric key pairs is stored in the external communication means, upon establishing contact of the external communication means with the field measuring device via the communication interface, the external communication means identifies itself by means of a public-key authentication with the stored private key to the field measuring device, the field measuring device authenticates the external communication means using a suitable public key stored in the field measuring device, and after successful authentication, the field measuring device opens an operating session in which the external communication means is granted access to the information technology content of the field measuring device, namely in the scope of rights of the public key corresponding to the suitable private key.

In the case of the field measuring device, the communication interface is preferably designed according to Bluetooth technology, for establishing an infrared interface or for communication via a wireless local area network (WLAN), or else according to the Ethernet standard.

Preferably, a scope of rights stored in the field measuring device permits access to a group of the following information technology content: parameters for the representation of data without influence on metrological functions, parameters for the commissioning of metrological functions, parameters for the calibration of the field measuring device, parameters for special functions and service, parameters for the activation of special functions.

Preferably, in the field measuring device, the operating session is terminated after at least one of the following events: performing a predetermined number of accesses to the information technology content of the field measuring device, expiration of a predetermined period of time after the start of the operating session, transmission of information for the explicit termination of the operating session or occurrence of an error condition in the field measuring device. Several of the criteria can also be implemented.

Another preferred design of the field measuring device is characterized in that the communication interface implements an encrypted secure shell network protocol (SSH), so that an encrypted network connection can be produced with an external communication means via the communication interface, wherein the communication interface is configured so that the external communication means has to be authenticated by public-key authentication for the field measuring device.

BRIEF DESCRIPTION OF THE DRAWINGS

In detail, there is a plurality of possibilities for designing the method according to the invention for secure communication with a field measuring device and the corresponding field measuring device.

Corresponding further developments are the subject matter of the subordinate claims and are described in the following in conjunction with the shown embodiments.

DETAILED DESCRIPTION

Figure 1:
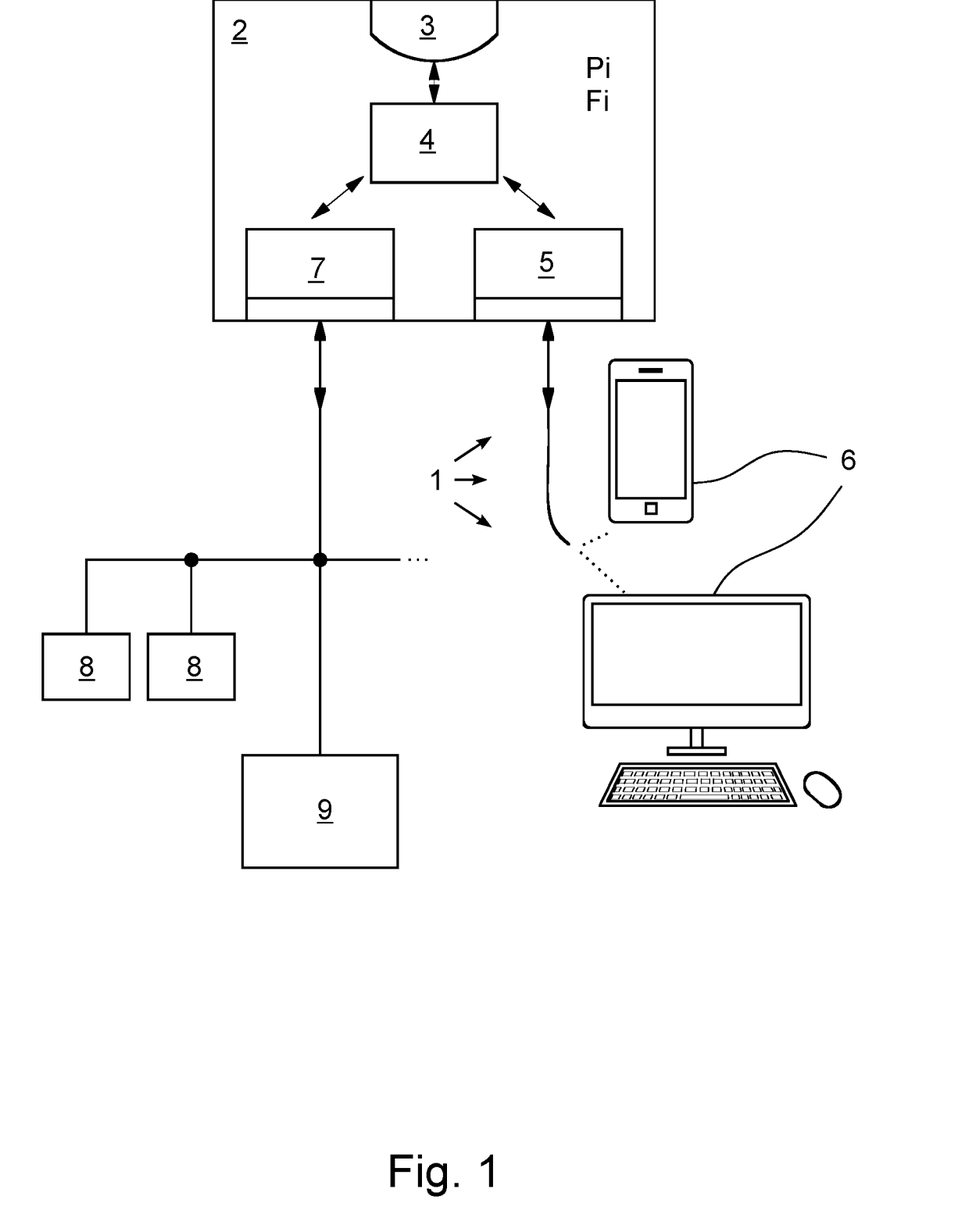
FIG. 1 provides a schematic representation of a field measuring device of process technology in the context of an industrial process as well as, schematically, a method for secure communication with the field measuring device.

In the figures, a method 1 for communication with a field measuring device 2 of process measuring technology is shown very schematically in each case. The field measuring device 2 has, as shown in FIG. 1, a sensor 3, with which a process variable is detected by measurement. Examples of sensors 3 are flow sensors according to various measuring principles, temperature sensors, distance sensors based on radar, pH sensors in the field of analysis, etc.

The field measuring device 2 also has an evaluation unit 4 and a communication interface 5. The evaluation unit 4 is used to detect and further process the raw measurement data supplied by the sensor 3. The evaluation unit 4 is also used the for subsequent evaluation of the data transmitted via the communication interface 5 with external communication means 6, which are shown here as a hand-held control device such e.g. a smart phone or a tablet and a computer workstation based on a personal computer.

The communication interface 5 is primarily used for the configuration, diagnosis and maintenance of the field measuring device 2 by the external communication means 6. In FIG. 1, the field measuring device 2 has a further communication interface, namely in the form of a fieldbus interface 7. The fieldbus interface 7 is, in the present case, a two-wire interface in the form of a 4-20 mA current loop. Such fieldbus interfaces are used to transmit the measurement data detected and provided by the field measurement device 2 to other bus devices 8 and to a process control system 9. Due to the only relatively low achievable transmission rates, such fieldbus interfaces 7 are not suitable for the configuration, diagnosis and maintenance of the field measuring device 2. Such functionality is also not desirable using the fieldbus interface 7 for security reasons, because the measured data transmitted by field measuring devices 2 often have an immediate effect on the control of an industrial process, which is why an unauthorized influencing of the field measuring device 2 should be prevented in any case, which is also ensured for example when the fieldbus interface 7 does not intend to receive any external data and to evaluate it for an internal configuration. For the reasons presented, particular attention must now be paid to secure communication with the field measuring device 2 via the communication interface 5.

Figure 2:
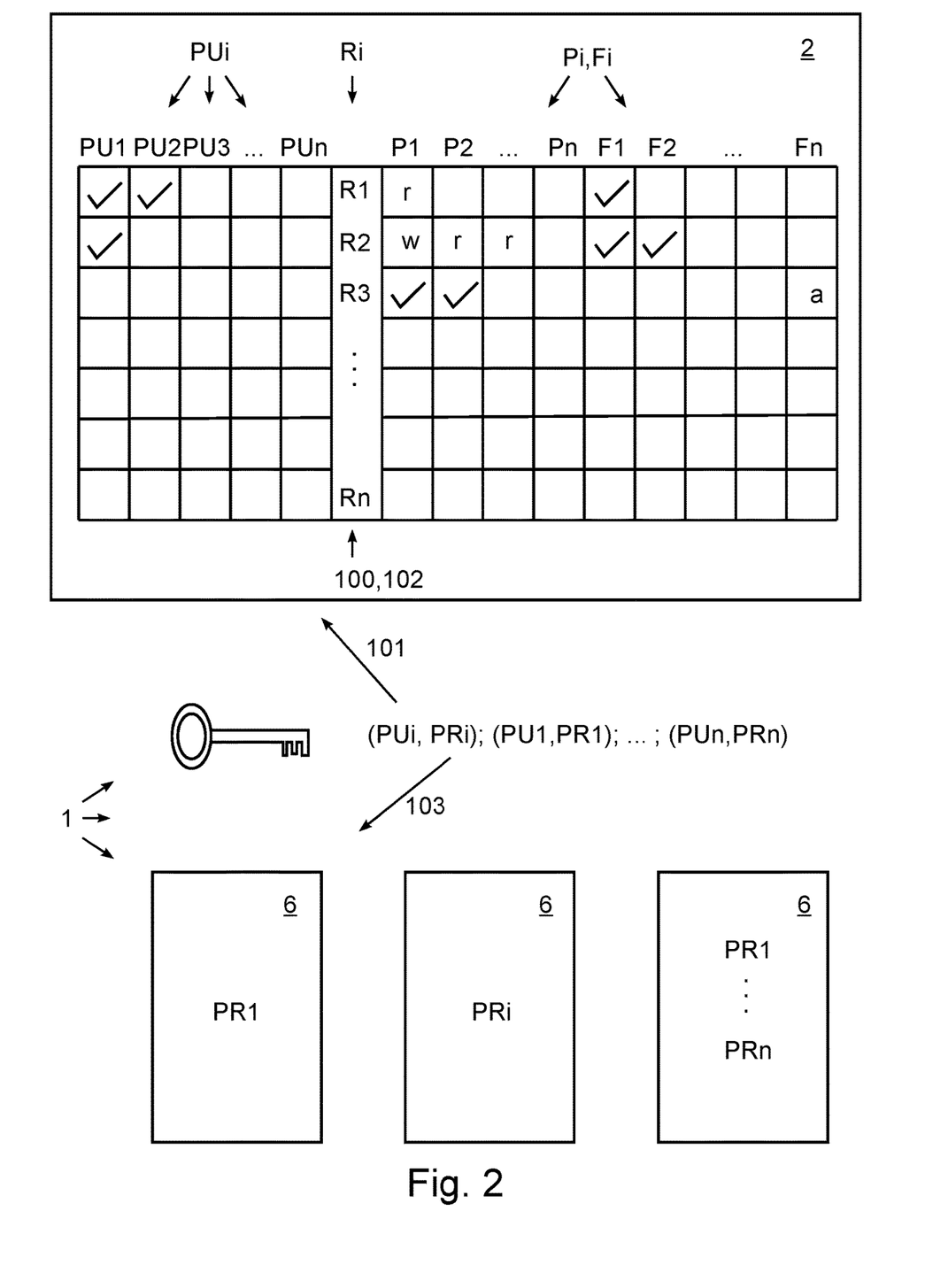
FIG. 2 illustrates an embodiment of the method according to the invention for secure communication with a field measuring device as well as a field measuring device designed for this.

The communication interface 5 can be used to externally access information technology content Pi, Fi of the field measuring device 2. The information-technology content of the field measuring device 2 can be both pure data/parameters Pi as well as functionalities Fi, wherein the information technology content Pi, Fi is not the actual measurement data. So that external access meets the high security requirements for industrial process measuring technology, the method 1 shown in detail in FIGS. 2 and 3 is designed in a special manner for reliable communication with the field measuring device 2.

In the method 1 for secure communication with the field measuring device 2, it is initially provided that a plurality of scopes of rights R1, R2, Ri, Rn is stored 100 in the field measuring device 2, each scope of rights Ri defining to which extent the information technology content Pi, Fi of the field meter can be accessed. This is shown in FIG. 2 in the form of a table. The scope of rights R1 allows, for example, read access r to the parameter P1 and the use of the functionality F1. The scope of rights R2 allows writing access w to the parameter P1 and read access to the parameters P2 and P3 as well as the use of the functionalities F1 and F2. The scope of rights R3 allows full access to the parameters P1 and P2 and the permanent activation of the functionality Fn; This can be, for example, the activation of a subsequently acquired measuring device functionality.

In addition, a plurality of public keys PUi of a corresponding plurality of asymmetric key pairs PUi, PRi are stored 101 in the field measuring device 2 and each public key PU1 is assigned 102 a scope of rights Ri. In the representation according to FIG. 2, the public key PU1 is assigned the scopes of rights R1, R2, the public key PU2 is assigned the scope of rights R1 and the public key PUn is assigned the scope of rights R3 102. Furthermore, at least one private key PRi of the corresponding plurality of asymmetric key pairs PUi, PRi is stored 103 in the external communication means 6. In this case, three external communication means 6 are shown in FIG. 2, where the first external communication means 6 has the private key PR1, the second external communication means 6 has the private key PRi and the third external communication means 6 has all the private keys PR1 to PRn.

Figure 3:
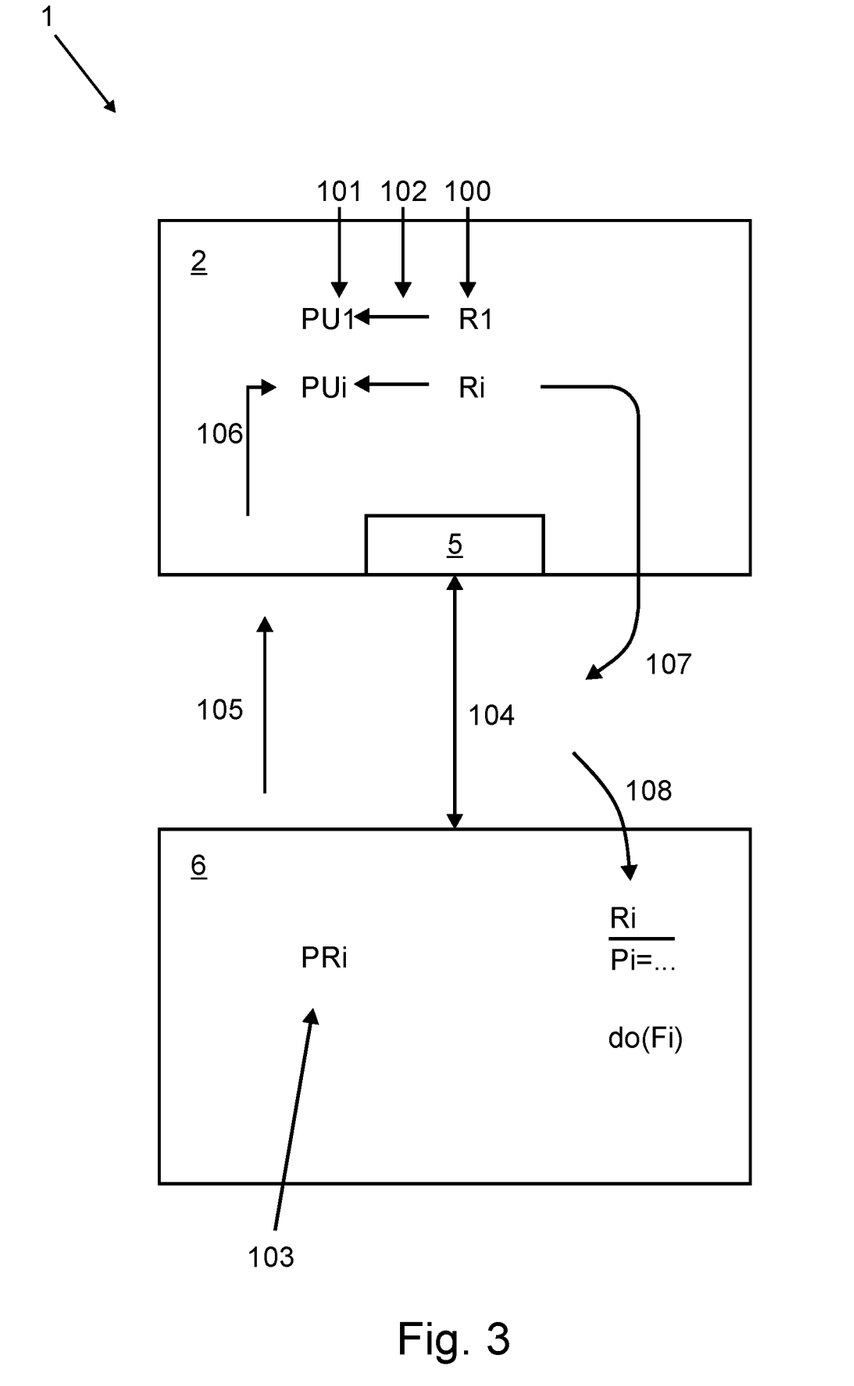
FIG. 3 illustrates a further embodiment of a method according to the invention for secure communication with a field measuring device as well as such a field measuring device that communicates with an external communication means.

FIG. 3 shows the further course of the secure communication between the field measuring device 2 and the external communication means 6. Upon establishing contact 104 of the external communication means 6 with the field measuring device 2 via the communication interface 4, the external communication means 6 identifies itself 105 to the field measuring device 2 by means of a public-key authentication with the stored private key PRi. For this, the external communication means 6, for example, can send unencrypted but signed information to the field measuring device 2, but it can also receive, for example, a random number from the field measuring device 2, encrypt it with its private key PRi, and send it back to the field meter 2 again.

The field meter then authenticates 106 the external communication means 6 using a suitable public key PUi stored in the field measuring device 2. In the case of the encrypted random value returned by the external communication means 6, the field measuring device 2 decrypts the encrypted random value with its suitable public key PUi, wherein authentication 106 has succeeded if the transmitted random value and the received decrypted random value are identical. The prerequisite in this case is that the consecutive application of the public key PUi and the private key PRi is commutative.

After successful authentication 106, the field measuring device 2 opens an operating session 107, i.e. secure communication between the field measuring device 2 and the external communication means 6 is now possible, at least to the extent that the external communication means 6 has been reliably detected. The field measuring device 2 then grants access to the external communication means 6 to its information technology content Pi, Fi, specifically in the scope of rights Ri of the public key PUi corresponding to the suitable private key PRi. To illustrate this, the external means of communication 6 in FIG. 3 shows the scope of rights Ri, with which it is now possible to influence the parameter Pi and call up the Fi function in the field measuring device (do(Fi)), but the parameter Pi and the Fi function are not located in the external means of communication 6.

In the two embodiments in FIG. 1, contact is established between the field measuring device 2 and the smart phone 6 as an external communication means by means of a communication interface 5 executed using Bluetooth technology. The connection between the field measuring device 2 and the personal computer as external communication means 6, however, takes place via a communication interface 5 configured as an Ethernet interface.

Figure 4:
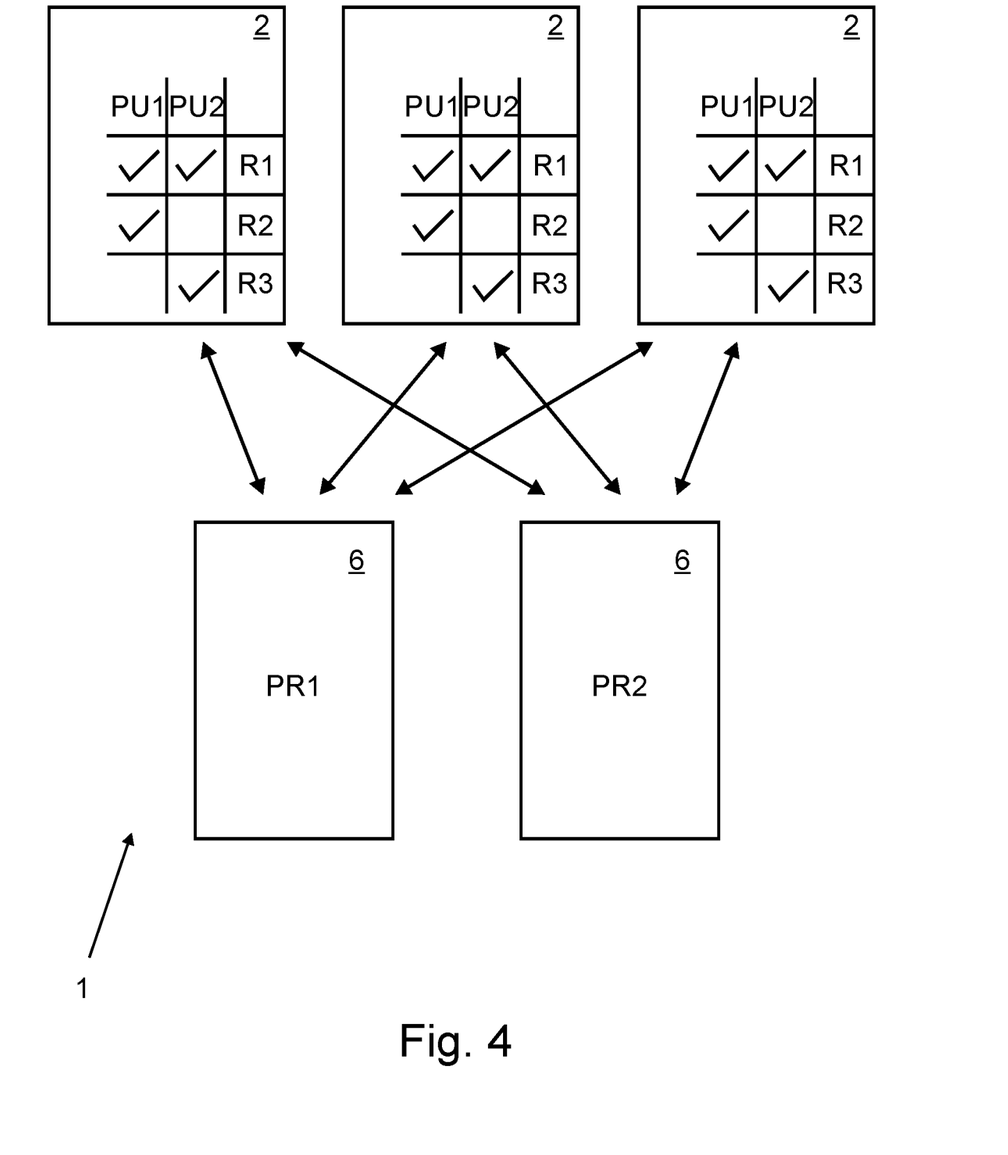
FIG. 4 illustrates a plurality of field measuring devices according to the invention with corresponding scopes of rights and public keys.

FIG. 4 shows an embodiment of the method 1 in which the same scopes of rights Ri are stored in a plurality of field measuring devices 2 and the same public keys PUi of a corresponding plurality of asymmetrical key pairs PUi, PRi are stored. As a result, a very simple access to a plurality of field measuring devices 2 is possible without having to distribute a large number of different asymmetrical key pairs PUi, PRi. In the illustrated embodiment, the plurality of field measuring devices 2 belongs to the measuring device group of a system part of an industrial system.

The external communication means 6 likewise shown in FIG. 4 is able to access all field measuring devices 2 with only one private key PR1 or PR2, but in different scopes of rights.

For the sake of completeness, it is pointed out that the figures, of course, show not only a method 1 for secure communication with a field measuring device 2 of process measuring technology, but also a corresponding field measuring device 2 of process measuring technology with a sensor 3, an evaluation unit 4 and a communication interface 5, wherein information technology content Pi, Fi of the field measuring device 2 is externally accessible for an external communication means 6 via the communication interface 5.

Secure communication is ensured in that a plurality of scopes of rights Ri are stored in the field measuring device 2, wherein each scope of rights Ri defines the extent to which the information technology content Pi, Fi of the field measuring device 2 can be accessed.

A plurality of public keys PUi of a corresponding plurality of asymmetrical key pairs PUi, PRi is also stored in the field measuring device 2, and each public key PUi is assigned a scope of rights Ri, wherein at least one private key PRi of the corresponding plurality of asymmetrical key pairs (PUi, PRi) is stored in the external communication means 6.

Upon establishing contact 104 of the external communication means 6 with the field measuring device 2 via the communication interface 5, the external communication means 6 identifies itself to the field measuring device 2 by means of a public-key authentication with the stored private key PRi. Then the field measuring device 2 authenticates the external communication means 6 using a suitable public key PUi stored in the field measuring device 2. After successful authentication, the field measuring device 2 opens an operating session in which the external communication means 6 is granted access to the information technology content Pi, Fi of the field measuring device 2, namely in the scope of rights Ri of the public key PUi corresponding to the suitable private key PRi.

The invention claimed is:

1. A method for secure communication with a field measuring device of process measuring technology, wherein the field measuring device comprises a sensor, an evaluation unit, a fieldbus interface for the transmission of measurement data detected and provided by the field measuring device to other bus devices and/or to a process control system, and a communication interface, and wherein an external communicator has external access to information technology content of the field measuring device via the communication interface, wherein the information technology content is not the actual measurement data, the method comprising:
   storing a plurality of scopes of rights in the field measuring device, wherein each scope of rights defines to what extent the information technology content of the field measuring device can be accessed;
   storing a plurality of public keys of a corresponding plurality of asymmetrical key pairs in the field measuring device;
   assigning each public key a scope of rights;
   storing at least one private key of the corresponding plurality of asymmetric key pairs in the external communicator;
   upon establishing contact of the external communicator with the field measuring device via the communication interface, the external communicator identifies itself by a public-key authentication with the stored private key to the field measuring device;
   authenticating the external communicator using a suitable public key stored in the field measuring device; and
   after successful authentication, opening an operating session in which the external communicator is granted access to the information technology content of the field measuring device, namely in the scope of rights of the public key corresponding to the suitable private key.

2. The method according to claim 1, wherein the communication interface is designed according to one of the following technologies: Bluetooth, wireless local area network, infrared, Ethernet.

3. The method according to claim 2, wherein a scope of rights stored in the field measuring device allows access to a group of the following information technology content: parameters for representation of data without influence on metrological functions, parameters for commissioning of metrological functions, parameters for calibration of the field measuring device, parameters for special functions and service, parameters for activation of special functions.

4. The method according to claim 1, wherein the same scopes of rights are stored in a plurality of field measuring devices and the same public keys of a corresponding plurality of asymmetric key pairs are stored.

5. The method according to claim 4, wherein the plurality of field measuring devices belong to at least one of the following measuring device groups: the measuring device group of a specific measuring method, the measuring device group of a field measuring device model, the measuring device group of the field measuring devices of a specific user, the measuring device group of the field measuring devices of a system or a part of the system, the measuring device group of the field measuring devices of a certain time production interval or installation interval.

6. The method according to claim 1, wherein the operating session is terminated after at least one of the following events: performing a predetermined number of accesses to the information technology content of the field measuring device, expiration of a predetermined period of time after the start of the operating session, transmission of information for the explicit termination of the operating session, occurrence of an error condition in the field measuring device.

7. The method according to claim 1, wherein a plurality of private keys are stored in the external communicator and the external communicator identifies itself by a public-key authentication to the field meter in that identification data of the field measuring device is transmitted to the external communicator, the external communicator selects an suitable private key based on the identification data, and the external communicator identifies itself with the selected suitable private key to the field meter.

8. The method according to claim 1, wherein the external communicator and the field measuring device connect via the communication interface by an encrypted secure shell network protocol (SSH), wherein the external communicator is authenticated for the field measuring device by public-key authentication.

9. A field measuring device of process measuring technology, comprising:
   a sensor;
   an evaluation unit;
   a fieldbus interface for the transmission of measured data detected and provided by the field measuring device to other bus devices and/or to a process control system; and
   a communication interface, wherein information technology content of the field measuring device is externally accessible for an external communicator via the communication interface and wherein the information technology content is not the actual measurement data;
   wherein a plurality of scopes of rights is stored in the field measuring device, wherein each scope of rights defines to what extent the information technology content of the field measuring device can be accessed;
   a plurality of public keys of a corresponding plurality of asymmetrical key pairs are stored in the field measuring device and each public key is assigned a scope of rights, wherein at least one private key of the corresponding plurality of asymmetric key pairs is stored in the external communicator;

upon establishing contact of the external communicator with the field measuring device via the communication interface, the external communicator identifies itself by a public-key authentication with the stored private key to the field measuring device, the field measuring device authenticates the external communicator using a suitable public key stored in the field measuring device; and after successful authentication, the field measuring device opens an operating session in which the external communicator is granted access to the information technology content of the field measuring device, namely in the scope of rights of the public key corresponding to the suitable private key.

10. The field measuring device according to claim 9, wherein the communication interface is designed according to one of the following technologies: Bluetooth, wireless local area network, infrared, Ethernet.

11. The field measuring device according to claim 9, wherein a scope of rights stored in the field measuring device allows access to a group of the following information technology content: parameters for representation of data without influence on metrological functions, parameters for commissioning of metrological functions, parameters for calibration of the field measuring device, parameters for special functions and service, parameters for activation of special functions.

12. The field measuring device according to claim 9, wherein the operating session is terminated after at least one of the following events: performing a predetermined number of accesses to the information technology content of the field measuring device, expiration of a predetermined period of time after the start of the operating session, transmission of information for the explicit termination of the operating session, occurrence of an error condition in the field measuring device.

13. The field measuring device according to claim 9, wherein the communication interface implements an encrypted secure shell network protocol (SSH), so that an encrypted network connection can be produced with an external communicator via the communication interface, wherein the communication interface is configured so that the external communicator has to be authenticated by public-key authentication for the field measuring device.

14. A method for secure communication with one or more field measuring devices of process measuring technology, the method comprising:

storing a first scope of rights and a second scope of rights in a field measuring device, wherein the first scope of rights defines access rights to at least two first information technology (IT) contents of the field measuring device, the second scope of rights defines access rights to at least two second IT contents of the field measuring device, and the first IT contents are different than the second IT contents;

storing a first public key of a first asymmetric key pair, and a second public key of a second asymmetric key pair, in the field measuring device;

assigning the first public key to the first scope of rights, and the second public key to the second scope of rights;

storing a first private key of the first asymmetric key pair in a first external communicator having external access to the field measuring device via a communication interface thereof;

upon establishing contact of the first external communicator with the field measuring device via the communication interface, the first external communicator identifying itself using the first private key;

authenticating the first external communicator using the first public key stored in the field measuring device; and after successful authentication of the first external communicator, granting the first external communicator access to the first IT contents defined by the first scope of rights.

15. The method of claim 14, wherein the at least two first IT contents include at least one of a first parameter and a first functionality of the field measuring device; and wherein the at least two second IT contents include at least one of a second parameter and a second functionality of the field measuring device.

16. The method of claim 15, further comprising:

storing a second private key of the second asymmetric key pair in the first external communicator; and after successful authentication of the first external communicator, granting the first external communicator access to the first IT contents and the second IT contents.

17. The method of claim 15, further comprising:

storing a second private key of the second asymmetric key pair in a second external communicator having external access to the field measuring device via the communication interface thereof, wherein the second external communicator is different than the first external communicator;

upon establishing contact of the second external communicator with the field measuring device via the communication interface, the second external communicator identifying itself using the second private key;

authenticating the second external communicator using the second public key stored in the field measuring device; and after successful authentication of the second external communicator, granting the second external communicator access to the second IT contents defined by the second scope of rights.

18. The method of claim 15, wherein the field measuring device is a first field measuring device; and wherein the method further comprises storing the first scope of rights, the second scope of rights, the first public key, and the second public key in a second field measuring device that is different than the first field measuring device.

* * * * *